US012014299B2

(12) United States Patent
Menezes (10) Patent No.: US 12,014,299 B2
(45) Date of Patent: Jun. 18, 2024

(54) HYPER-DETECTION OF USER ACTIVITY (71) Applicant: International Business Machines Corporation, Armonk, NY (US)

(72) Inventor: Denzil Sunil Menezes, Coppell, TX (US)

(73) Assignee: International Business Machines Corporation, Armonk, NY (US)

(*) Notice: Subject to any disclaimer, the term of this patent is extended or adjusted under 35 U.S.C. 154(b) by 967 days.

(21) Appl. No.: 17/002,825

(22) Filed: Aug. 26, 2020

(65) Prior Publication Data

US 2022/0067631 A1 Mar. 3, 2022

(51) Int. Cl.
*G06Q 10/06* (2023.01)
*G06N 20/00* (2019.01)
*G06Q 10/0631* (2023.01)
*G06V 40/20* (2022.01)
*G06T 7/20* (2017.01)
*G08B 21/00* (2006.01)

(52) U.S. Cl.
CPC ..... *G06Q 10/063114* (2013.01); *G06N 20/00* (2019.01); *G06V 40/20* (2022.01); *G06T 7/20* (2013.01); *G08B 21/00* (2013.01)

(58) Field of Classification Search
CPC ........... G06Q 10/063114; G06N 20/00; G06V 40/20; G06V 20/52; G06V 40/23; G06T 7/20; G08B 21/00; G08B 21/0446
See application file for complete search history.

(56) References Cited

U.S. PATENT DOCUMENTS

| 7,027,621 | B1 * | 4/2006 | Prokoski | G06V 40/165 |
| | | | | 340/576 |
| 8,438,127 | B2 | 5/2013 | Kurata | |
| 8,694,350 | B1 | 4/2014 | Cohen | |
| 9,222,798 | B2 | 12/2015 | Curtis | |
| 9,504,408 | B2 | 11/2016 | Hong | |
| 10,559,145 | B1 * | 2/2020 | Almehmadi | G06N 3/045 |
| 11,049,349 | B2 * | 6/2021 | Onischuk | G07C 13/00 |
| 2007/0013512 | A1 | 1/2007 | Burneske | |

(Continued)

FOREIGN PATENT DOCUMENTS

EP 2523069 A2 11/2012
KR 2010050831 A * 5/2010

OTHER PUBLICATIONS

"Gesture recognition", Wikipedia, This page was last edited on Mar. 6, 2020, 14 pages, <https://en.wikipedia.org/wiki/Gesture_recognition>.

(Continued)

*Primary Examiner* — Joseph J Dallo
(74) *Attorney, Agent, or Firm* — James L. Olsen (57) ABSTRACT

Embodiments of the present invention provide a computer system a computer program product, and a method that comprises determining a task that is being performed based on a set of observed micromovements; in response to determining the task that is being performed, detecting an anomaly in at least one micromovement in the set of observed micromovements based on a comparison of the at least one micromovement to one or more micromovements associated with an established baseline of micromovements; and generating a notification on a user interface that details the detected anomaly.

17 Claims, 3 Drawing Sheets

(56) References Cited

U.S. PATENT DOCUMENTS

| | | | |
|---|---|---|---|
| 2011/0178969 A1 | 7/2011 | Falchuk | |
| 2015/0364057 A1 | 12/2015 | Catani | |
| 2017/0124832 A1 | 5/2017 | Jobin | |
| 2019/0034020 A1* | 1/2019 | He | H10K 59/12 |
| 2019/0087691 A1* | 3/2019 | Jelveh | G06N 3/084 |

OTHER PUBLICATIONS

"Use fall detection with Apple Watch", Published Date: Mar. 24, 2020, Copyright © 2020 Apple Inc., 3 pages, <file:///Volumes/projects-2/1-Dockets/P [Think IP]/2019/P201907208US01/Use fall detection with Apple Watch—Apple Support.html>.

Barrera-Animas et al., "Online personal risk detection based on behavioural and physiological patterns", Information Sciences 384 (2017) 281-297, © 2016 The Authors, Published by Elsevier Inc.

Bourobou et al., "User Activity Recognition in Smart Homes Using Pattern Clustering Applied to Temporal ANN Algorithm", Sensors 2015, 15, 11953-11971; doi:10.3390/s150511953, Published: May 21, 2015, ISSN 1424-8220, 19 pages.

Jalal et al., "Wearable Sensor-Based Human Behavior Understanding and Recognition in Daily Life for Smart Environments", ResearchGate, Article • Nov. 2018, 7 pages, <https://www.researchgate.net/publication/328686708>.

Ma et al., "An Action Recognition Method Based on Wearable Sensors", International Conference on Ad Hoc Networks, ADHOCNETS 2018, 6 pages, <https://rd.springer.com/chapter/10.1007/978-3-030-05888-3_19>.

Phithakkitnukoon, et al., "Activity-Aware Map: Identifying human daily activity pattern using mobile phone data", MIT Open Access Articles, Printed Mar. 28, 2020, 14 pages, <http://link.springer.com/chapter/10.1007%2F978-3-642-14715-9_3>.

* cited by examiner

HYPER-DETECTION OF USER ACTIVITY

FIELD OF INVENTION

The present invention relates generally to the field of user pattern recognition, and more specifically user safety activity and pattern.

BACKGROUND

A tracking system is used for the observing of persons or objects on the move and supplying a timely ordered sequence of location data for further processing. There are myriads of tracking systems, and they generally span multiple platforms of software to track multiple areas. An example is a lag time indicator, which the data is collected after an item has passed a point, such as a bar code or choke points. These generally require a person to physically move an item. Another example is a real-time or near real time indicator, which is similar to Global Positioning Systems ("GPS"). Real-time and near real-time tracking systems depend on how often the data is refreshed.

Location-based services ("LBS") is a term that is derived from the telematics and telecom world. The combination of a newer GPS and cellular calling technology is what has enabled the latest LBS for handsets and personal computing devices. Line of sight is not necessarily required for a location fix, which assists when GPS is lost indoors. This enables computing devices to precisely track locations indoors.

SUMMARY

Embodiments of the present invention provide a computer system a computer program product, and a method that comprises determining a task that is being performed based on a set of observed micromovements; in response to determining the task that is being performed, detecting an anomaly in at least one micromovement in the set of observed micromovements based on a comparison of the at least one micromovement to one or more micromovements associated with an established baseline of micromovements; and generating a notification on a user interface that details the detected anomaly.

DETAILED DESCRIPTION

Embodiments of the present invention recognize the need for a tracking system that actively learns a user's activity pattern to detect the task being performed by that user. Embodiments of the present invention provides systems, methods, and computer program products for a solution to common navigational tracking systems using pattern recognition technology. Currently, most tracking systems track a user's location or an item's location. Some tracking systems even predict destination by examining a user's final destination history or frequently visited locations. However, embodiments of the present invention provide systems, methods, and computer program products that provides a tracking system that detects micromovements, while the micromovements are being performed. However, embodiments of the present invention provide systems, methods, and computer program products that track and observe a user's micromovements and location patterns to automatically recommend safety or optimized adjustments to complete a predicted pattern. Embodiments of the present invention are an improvement to current near real-time tracking systems providing a tracking system that tracks micromovements of a user and simultaneously associates the tracked micromovements with similar tasks that are performed by others. a personalized content to assist with that task. Embodiments of the present invention access a user's computing device, locates the user's, tracks the user's micromovements, establishes a user baseline, determines a task that the user is performing, detects an anomaly in the user's micromovements, and generates a notification detailing the determination of the user's task.

Figure 1:
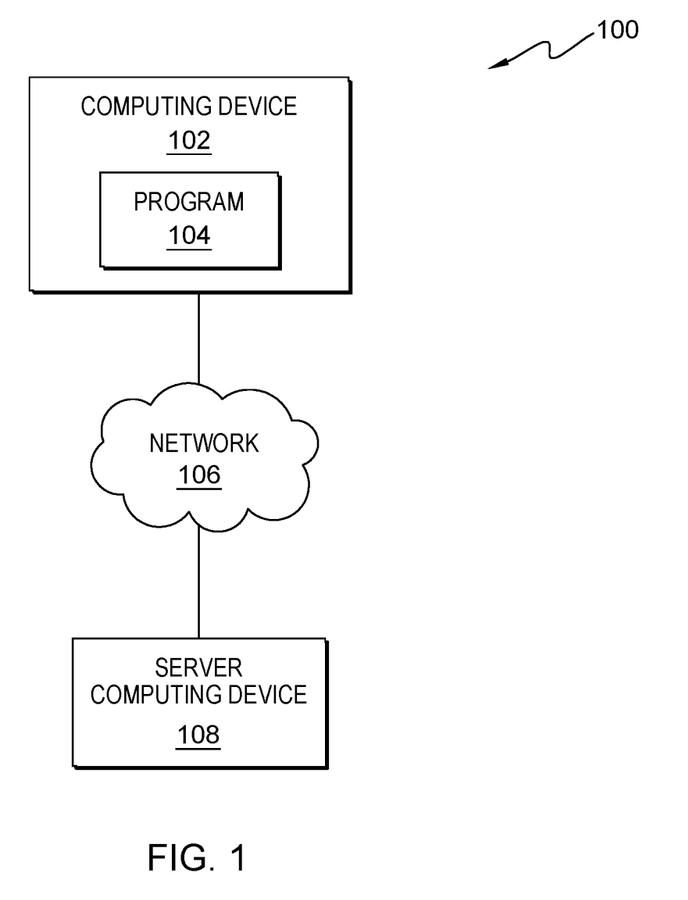
FIG. 1 is a functional block diagram depicting an environment with a computing device connected to or in communication with another computing device, in accordance with at least one embodiment of the present invention.

FIG. 1 is a functional block diagram of a computing environment 100 in accordance with an embodiment of the present invention. The computing environment 100 includes a computing device 102 and a server computing device 108. The computing device 102 and the server computing device 108 may be desktop computers, laptop computers, specialized computer servers, smart phones, wearable technology, or any other computing devices known in the art. In certain embodiments, the computing device 102 and the server computing device 108 may represent computing devices utilizing multiple computers or components to act as a single pool of seamless resources when accessed through a network 106. Generally, the computing device 102 and the server computing device 108 may be representative of any electronic devices, or a combination of electronic devices, capable of executing machine-readable program instructions, as described in greater detail with regard to FIG. 4.

The computing device 102 may include a program 104. The program 104 may be a stand-alone program on the computing device 102. In another embodiment, the program 104 may be stored on a server computing device 108. In the embodiment, the program 104 accesses the user's computing device 102 after receiving an opt-in/opt-out permission from a user. In this embodiment, the program 104 improves the ability for current tracking systems to provide navigational directions and recommend safety standards by tracking micromovements of a user, determining a task the user is performing using the tracked micromovements, detecting an anomaly in the user's micromovements, and generating a notification detailing the determination of the user's task, which assists in the safety and efficiency in the completion of the tasks that user is currently performing. In another embodiment, the program 104 accesses audio and video components of a computing device 102, locates a user's, establishes the user's baseline, tracks the user's micromovements, and generates a notification based on pattern recognition of the user's micromovements.

In another embodiment and in response to receiving opt-in/opt-out permission, the program 104 accesses an audio component of the user's computing device 102 and uses a voice recognition algorithm to establish a baseline of the task the user is performing. In another embodiment and in response to receiving opt-in/opt-out permission, the program 104 accesses a video component of the user's computing device 102 and uses a facial recognition algorithm to establish a baseline of the task the user is performing. In this embodiment, the program 104 uses a near real-time tracking system, similar to GPS, to track the user's micromovements.

Micromovements are motions or gestures that when combined form an activity. In this embodiment, the program 104 collects micromovements for a period of time and associates those micromovements with an activity. The period of time varies from activity to activity but is determined by artificial intelligence algorithms and pattern recognition algorithms in response to learning the activity that is being performed. For example, a period of time for driving a car may be every second, while the period of time for cooking may be every minute. In another embodiment, a singular micromovement may be enough for the program 104 to determine the activity, but in others a collection of multiple micromovements is required to determine an activity.

In this embodiment, the program 104 automatically updates the near real-time tracking systems to proactively observe minute micromovements and location patterns. Using the access to the user's computing device 102 and near real-time tracking system, the program 104 monitors the task that the user is currently performing. In this embodiment, the program 104 detects anomalies in the user's micromovements using a pattern recognition algorithm. An anomaly is defined as any movement that deviates from the established baseline of the stored simulated tasks. In one embodiment, the program 104 has pre-saved simulated tasks through the manufacturer. In another embodiment and in response to the program 104 failing to determine the task the user is performing, the user may manually input the task the user is performing, which the program 104 learns and saves. In another embodiment and in response to the program 104 failing to determine the task the user is performing, the program 104 uses a machine learning algorithm and artificial intelligence algorithm to learn the task the user is performing. In this embodiment, the program 104 learns tasks by associating micromovements with a learned activity and a perception of time. Perception of time is defined as the ability to track time, as the length of time it takes for a micromovement to be completed and the awareness of time of day.

In this embodiment, the program 104 generates a notification that details the task being performed by the user. In this embodiment, the program 104 uses the generated notification to assist in the completion of the task that the user is performing by detailing final micromovements or safety precautions accompanied with task and integrating predetermined recommendations. A safety precaution is defined as an action taken in advance to protect against possible danger, failure, or injury. A predetermined recommendation is defined as recommendation that the program 104 previously learned before the tracking of the micromovements. The program 104 may have learned the predetermined recommendations from the manufacturer, from the user's manual input, or from other's recommendations, which may be considered community feedback. In this embodiment, the program 104 increases the safety of the learned task; but also, by protecting against possible failure, the program 104 increases the efficiency of the learned task.

The network 106 can be a local area network ("LAN"), a wide area network ("WAN") such as the Internet, or a combination of the two; and it may include wired, wireless, or fiber optic connections. Generally, the network 106 can be any combination of connections and protocols that will support communication between the computing device 102 and the server computing device 108, specifically the program 104 in accordance with a desired embodiment of the invention.

The server computing device 108 may include the program 104 and may communicate with the computing device 102 via the network. The server computing device 108 may be a single computing device, a laptop, a cloud-based collection of computing devices, a collection of servers, and other known computing devices. In this embodiment, the server computing device 108 may be an external device connected to the computing device 102 via the network 106 to assist the program 104 in transmitting personalized content to the computing device 102 to assist in the completion of the task that the user is currently performing.

Figure 2:
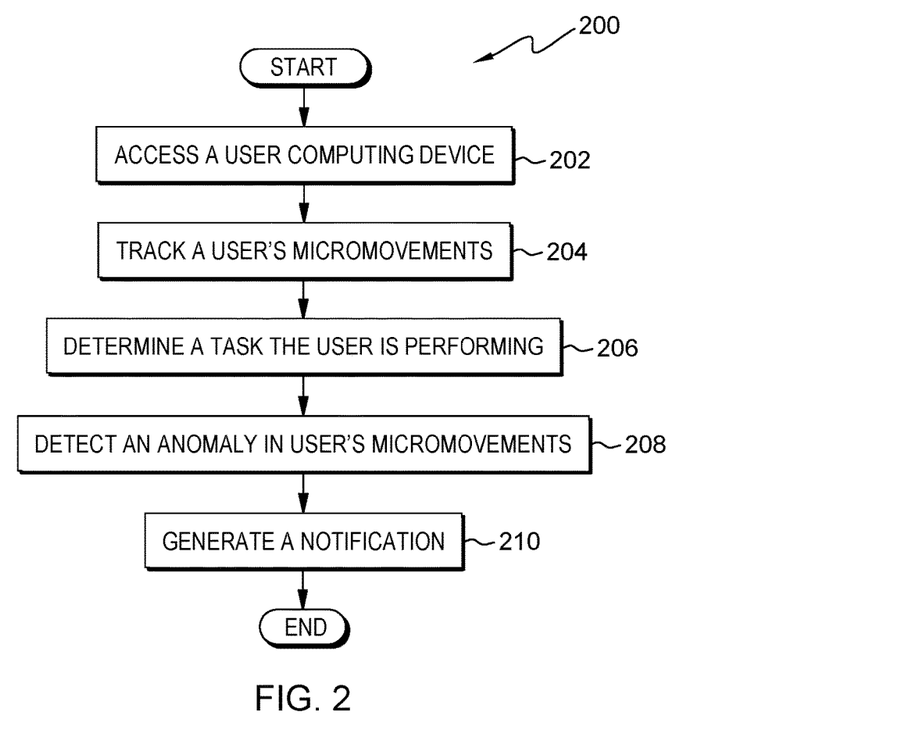
FIG. 2 is a flowchart illustrating operational steps for generating a notification to assist in near real-time with a task, in accordance with at least one embodiment of the present invention.

FIG. 2 is a flowchart illustrating operational steps for generating a notification to assist in near real-time with a task.

In step 202, the program 104 accesses the user computing device 102. In this embodiment, the program 104 receives opt-in/opt-out permission from a user before the program 104 can access the user's computing device 102. In another embodiment, the program 104 accesses audio and video components of the user computing device 102. In this embodiment, the computing device 102 may be a smart phone or wearable technology. In another embodiment, the computing device 102 may be more specific technology, such as a smart appliance located in the kitchen, a smart car, smart glasses, or a smart watch. In this embodiment, the program 104 uses a voice recognition algorithm to identify the user's voice, and the program 104 uses a facial recognition algorithm to identify the user. In this embodiment, the program 104 uses these algorithms to observe the task that the user is performing. For example, the program 104 accesses a user's smart phone or wearable technology to observe that the user is cooking dinner by hearing the user discuss ingredients and observing the user place different ingredients in different bowls. In another embodiment, the program 104 observes the user from a smart appliance such as a smart television or smart refrigerator.

In step 204, the program 104 tracks the user's micromovements. In this embodiment, the program 104 uses a near real-time tracking system to track the micromovements of the user. A near real-time tracking system allows the program 104 to track the smallest of movements of the user every time that the program 104 refreshes, and the program 104 automatically refreshes the tracking system on timed intervals. Timed intervals are defined as distinct measure of time, which may be every second, every few seconds, or every minute depending to the task the user is performing. In another embodiment, the program 104 automatically refreshes when it observes the user performing a task, which reloads a specific application of the program 104 to push data that the program 104 has collected to continue to track the user's micromovements. In another embodiment, the program 104 may refresh at specific intervals of a task, which stops the timed interval and starts a new time interval associated with the task. In another embodiment, the program 104 tracks a location of the user, tracks changes to the user's location, and tracks micromovements of the user while the user is changing locations, due to the nature of the task that requires the user to move from location to location to complete. In another embodiment, the program 104 combines the use the near real-time tracking system with the facial and voice recognition algorithms to track the user's movements indoors. In another embodiment, the program 104 may also use accelerometers, gyroscopes, magnetometers, and other forms of GPS to track the user's micromovements. In another embodiment, the program 104 locates a user. For example, the program 104 tracks the user's micromovements of opening refrigerator doors, pulling ingredients, mixing ingredients, and placing ingredients in the oven. In another embodiment, the program 104 uses a real-time tracking system to continually track the user's location without being refreshed.

In step 206, the program 104 determines a task that the user is performing based on tracked micromovements. In this embodiment, the program 104 uses the micromovements of the user to determine the task that is being performed, the steps required to complete that task, and the current step that user is on. In this embodiment, the program 104 uses pattern recognition algorithms, machine learning algorithms, and artificial intelligence algorithms to determine the task that user is performing based on tracked micromovements. In one embodiment, the program 104 has pre-saved simulated tasks through the manufacturer. In another embodiment and in response to the program 104 failing to determine the task the user is performing, the user may manually input the task the user is performing, which the program 104 learns and saves. In another embodiment and in response to the program 104 failing to determine the task the user is performing, the program 104 uses a machine learning algorithm and artificial intelligence algorithm to learn the task the user is performing. In another embodiment and in response to the program 104 failing to determine the task that is being performed, the program 104 prompts the user to manually input the task that is being performed. This allows the program 104 to learn the task and save the task for the next time the user performs the task. In another embodiment, the program 104 determines the task that is being performed and all the steps required to complete that task. In another embodiment, the program 104 establishes a baseline for the tracked micromovements to determine the task that the user is performing. The established baseline is defined as associated movements with a learned activity while being integrated with a perception of time. For example, the program 104 observes the user cooking, but using the Internet via the network 106, the program 104 determines that the user is baking a cake and observes that the user just completed the step of placing the cake in the oven.

In step 208, the program 104 detects an anomaly in the user's micromovements. In this embodiment, the program 104 analyzes the determined task being performed, predicts the remaining micromovements, and detects anomalies in the tracked micromovements to determine if recommendations should be provided to the user. This step will be further explained in FIG. 3. In this embodiment, the program 104 analyzes the determined task being performed by using a self-adjusting algorithm to learn micromovements based on tracked micromovements, manual user input, and community feedback to track the collection of micromovements over the timed interval. For example, the program 104 analyzes the tracked micromovements to determine that the user is preparing to drive away from a location. In this embodiment, the program 104 predicts remaining micromovement using the self-adjusting algorithm, artificial intelligence algorithms, and pattern recognition to determine the task being performed and the step of the task that the user is currently performing to predict the remaining steps of the task. For example, the program 104 determines the user is preparing to drive away from a location and tracks the micromovement of the user placing a key in the ignition, putting a foot on the break, and putting the car in reverse. In this embodiment, the program 104 detects anomalies in the tracked micromovement using the self-adjusting algorithms and pattern recognition algorithms to detect when a tracked micromovement is misplaced or missing. For example, the program 104 determines the user is preparing to drive away from a location and failed to observe surroundings prior to reversing and failed to secure the seatbelt. In another embodiment and in response to the program 104 failing to detect an anomaly, the program 104 may provide recommendations to the task. These recommendations are based on queries on the task, community feedback, and pre-saved recommendations from the manufacturer.

In step 210, the program 104 generates a notification detailing the determination of the task. In this embodiment, the program 104 generates a notification that details the anomaly or a recommendation to the task being performed by the user. In this embodiment, the program 104 uses the generated notification to assist in the completion of the task that the user is performing by detailing final micromovements or safety precautions accompanied with task and integrating predetermined recommendations. In this embodiment, the program 104 increases the safety of the learned task; but also, by protecting against possible failure, the program 104 increases the efficiency of the learned task. In another embodiment, the program 104 accesses the Internet via the network 106 to generate a notification that would assist in the completion of the task. In another embodiment, the program 104 generates a warning notification. In another embodiment and in response to generating the notification, the program 104 transmits the generated notification to the computing device 102. For example, the program 104 determines that the user is baking a cake that is in the oven; detects that the user failed to put on oven mitts before opening the oven; and generates a notification before the user can touch the cake that there is a safety risk that exists by the user failing to put on oven mitts. In the event that the user does not own oven mitts, the program 104 orders the oven mitts for the user to increase efficiency and safety of the tracked micromovements of baking a cake.

Figure 3:
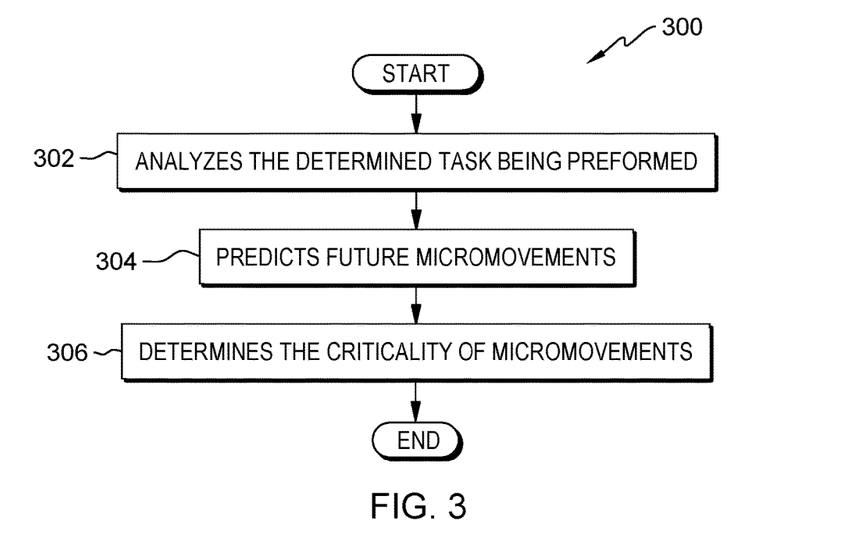
FIG. 3 is a flowchart illustrating operational steps for detecting an anomaly in a user's micromovements, in accordance with at least one embodiment of the present invention.

FIG. 3 is a flowchart 300 illustrating operational steps for detecting an anomaly in the user's micromovements.

In step 302, the program 104 analyzes the determined task being performed. In this embodiment, the program 104 analyzes the tracked micromovements to determine the task being performed. In this embodiment, the program 104 uses a self-adjusting algorithm to learn micromovements based on tracked micromovements, manual user input, and community feedback. The self-adjusting algorithm allows the program 104 to self-detect patterns in the tracked micromovements. For example, the program 104 learns the user's morning weekday routine and tracks that routine. In another example, the user inputs in the program 104 a workout routine for the program 104 to track. In another embodiments, the program 104 uses machine learning algorithms and artificial intelligence algorithms to analyze the tracked micromovements. In this embodiment, the program 104 must have stored data that details that a specific task is completed by a specific number of micromovements. In this embodiment, the program 104 uses a pattern recognition algorithm to predict future micromovements. Furthermore, the program 104 must know the order of the specific micromovements needed to complete the task safely and efficiently. In one embodiment, the program 104 has pre-saved simulated tasks through the manufacturer. In another embodiment and in response to the program 104 failing to determine the task the user is performing, the user may manually input the task the user is performing, which the program 104 learns and saves. In another embodiment and in response to the program 104 failing to determine the task the user is performing, the program 104 uses a machine learning algorithm and artificial intelligence algorithm to learn the task the user is performing.

In step 304, the program 104 predicts future micromovements. In this embodiment, the program 104 predicts future micromovements needed to complete the task by using a pattern recognition algorithm. In this embodiment, the program 104 learns the micromovements needed to complete performed tasks, filters out archaic micromovements of learned tasks, and determines the criticality of future micromovements to the completed of the task by using the self-adjusting algorithm. The self-adjusting algorithm allows the program 104 to self-detect patterns in the tracked micromovements. The program 104 replaces older, learned micromovements with new micromovements when the program 104 determines that the new micromovements increase the safety, the efficiency, or both of the completion of the learned task. In another embodiment, the program 104 may perform an automated command to assist in the completion of predicted future micromovements.

In step 306, the program 104 detects an anomaly. In this embodiment, the program 104 observes the tracked micromovements of the user, compares the tracked micromovements to the established baseline for the activity, and determines whether a tracked micromovement has been performed or not performed. For example, the program 104 observes the user leaving the house and knows the user drinks coffee daily while watching television before walking the dog and leaving, which establishes the baseline for the user's morning routine. In this example, the program 104 observes the user drinking coffee, walking the dog, and leaving; thus, the program 104 detects the anomaly that the user did not watch television.

In step 308, the program 104 determines the criticality of micromovements. In this embodiment, the program 104 determines the criticality of tracked micromovements in two ways. In one instance, the program 104 determines whether a single tracked micromovement meets or exceeds a predetermined threshold of criticality. In response to determining that the predetermined threshold of criticality is met or exceeded, the program 104 generates a notification, as previously discussed with respect to step 210 in flowchart 200. In another instance, the program 104 determines the criticality of micromovements based on a sum total of assigned values for each tracked micromovement that was either performed or not performed. For example, the program 104 assigns a value of 0.6 for the user's morning routine, and each micromovement of the routine has a value. In this example, drinking coffee and watching television were not performed by the user, and their assigned values may lower the sum for the entire routine below the predetermined threshold of criticality, which the program 104 would generate a notification detailing the routine. In this embodiment, the program 104 determines the criticality of the micromovements by using the self-adjusting algorithm to determine and predict each micromovement, assigning a numerical value for each micromovement, and calculating a total numerical value needed to complete the task. In this embodiment, the program 104 uses factors such as safety, efficiency, and community feedback to comprise the numerical value. when the program 104 determines that the tracked micromovements meets or exceeds the predetermined threshold of criticality. For example, the program 104 calculates a total score for leaving the house as 0.75 and the critical threshold is 0.5. In this example, the program 104 assigns a score of 0.15 for the micromovement of brushing teeth, assigns a score of 0.1 for the micromovement of drinking coffee, the program 104 assigns a score of 0.1 for the micromovement of getting dressed, the program 104 assigns a score of 0.05 for the micromovement of watching television, the program 104 assigns a score of 0.25 for the micromovement of taking the dog for a walk, and the program 104 assigns a score of 0.1 for the micromovement of grabbing the keys; the program 104 generates a notification to the user in response to micromovements that are not performed sums to meet or exceed the critical threshold of 0.5. In another embodiment, the program 104 recalculates an assigned value for a single micromovement that could be enough to meet or exceed the critical threshold (e.g., when reversing a car, the micromovement of observing the surroundings of the car may lead to a crash, so that is assigned a value that is at the critical threshold.) In the event that an anomaly is detected with a low numerical value assigned to that micromovement, the program 104 uses the self-adjusting algorithm to determine to maintain that micromovement as a step of the task or remove it so that the program 104 does not generate a notification for micromovements of low significance. A micromovement has low significance when the numerical value assigned to the cruciality of the micromovement does not exceed a predetermined threshold. Community feedback is defined as recommendations that the program 104 determines exceed the predetermined threshold for other users based on other user's reviews. The total numerical value is defined as the aggregation of the numerical value of each micromovement. The predetermined threshold is defined as a numerical value based on the number of micromovements needed to complete the task on a numerical scale, and the numerical scale is determined for each particular task.

In another embodiment, the program 104 determines the criticality of the micromovements needed to be performed, determines the micromovements completed, determines the micromovements that need to be completed, and calculates the numerical value if those micromovements are not completed. If the numerical values of the micromovements meets or exceeds the predetermined threshold, the program 104 detects an anomaly. If the numerical values of the micromovements does not exceed the predetermined threshold, the program 104 continues to track micromovements in the event that a micromovement is missed and an anomaly is detected. In another embodiment, the program 104 may perform an automated command in response to detecting an anomaly in tracked micromovements. The automated command could be ordering an item that is needed to complete the task. In another embodiment, the program 104 determines a value for each observed micromovement of a group of observed micromovements based on a matching of an observed movement to a baseline movement, wherein the baseline movement is assigned a corresponding value.

Figure 4:
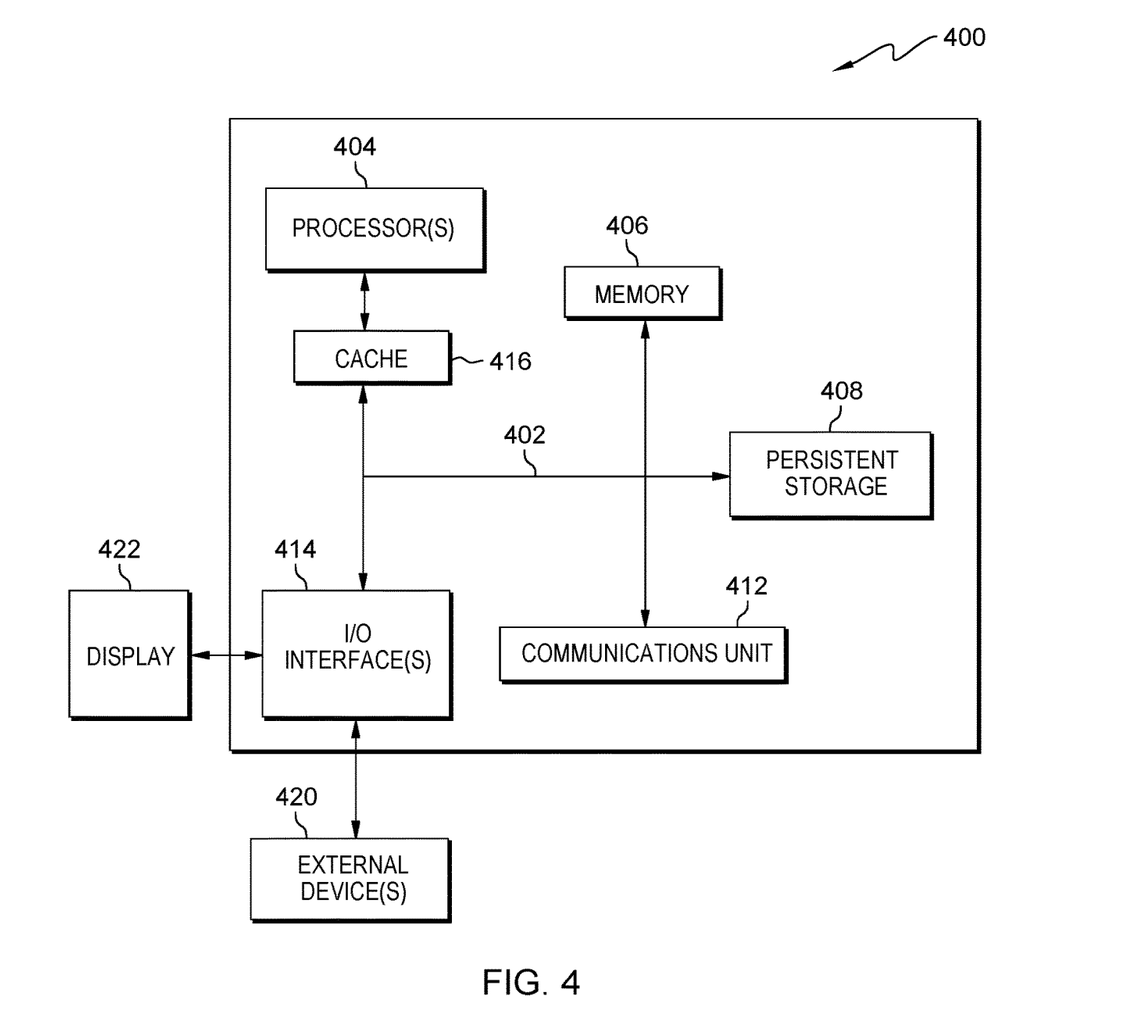
FIG. 4 is a functional block diagram depicting components of a computing systems within a haptic display environment of FIG. 1, in accordance with an embodiment of the present invention.

FIG. 4 depicts a block diagram of components of computing systems within a haptic display environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

A computer system 400 includes a communications fabric 402, which provides communications between a cache 416, a memory 406, a persistent storage 408, a communications unit 410, and an input/output (I/O) interface(s) 412. The communications fabric 402 can be implemented with any architecture designed for passing data and/or control information between processors (such as microprocessors, communications and network processors, etc.), system memory, peripheral devices, and any other hardware components within a system. For example, the communications fabric 402 can be implemented with one or more buses or a crossbar switch.

The memory 406 and the persistent storage 408 are computer readable storage media. In this embodiment, the memory 406 includes random access memory (RAM). In general, the memory 406 can include any suitable volatile or non-volatile computer readable storage media. The cache 416 is a fast memory that enhances the performance of the computer processor(s) 404 by holding recently accessed data, and data near accessed data, from the memory 406.

The program 104 may be stored in the persistent storage 408 and in the memory 406 for execution by one or more of the respective computer processors 404 via the cache 416. In an embodiment, the persistent storage 408 includes a magnetic hard disk drive. Alternatively, or in addition to a magnetic hard disk drive, the persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by the persistent storage 408 may also be removable. For example, a removable hard drive may be used for the persistent storage 408. Other examples include optical and magnetic disks, thumb drives, and smart cards that are inserted into a drive for transfer onto another computer readable storage medium that is also part of the persistent storage 408.

The communications unit 410, in these examples, provides for communications with other data processing systems or devices. In these examples, the communications unit 410 includes one or more network interface cards. The communications unit 410 may provide communications through the use of either or both physical and wireless communications links. The program 104 may be downloaded to the persistent storage 408 through the communications unit 410.

The I/O interface(s) 412 allows for input and output of data with other devices that may be connected to a mobile device, an approval device, and/or the server computing device 108. For example, the I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., the program 104, can be stored on such portable computer readable storage media and can be loaded onto the persistent storage 408 via the I/O interface(s) 412. The I/O interface(s) 412 also connect to a display 420.

The display 420 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   determining a task that is being performed based on a set of observed micromovements;
   analyzing the set of observed micromovements being performed by a user;
   determining the task associated with the analyzed micromovements being performed using a self-adjusting algorithm;
   predicting future micromovements associated with the determined task based on an established baseline set of micromovements associated with the determined task using a pattern recognition algorithm;
   in response to determining the task that is being performed, detecting an anomaly in at least one micromovement in the set of observed micromovements based on a comparison of the at least one micromovement to one or more micromovements associated with an established baseline of micromovements;
   detecting the anomaly in the determined task based on a comparison of the observed micromovements and the predicted future micromovements;
   in response to detecting the anomaly in the determined task, determining a criticality score for the detected anomaly based on a predetermined threshold; and
   generating a notification on a user interface that details the detected anomaly.

2. The computer-implemented method of claim 1, wherein determining a task that is being performed comprises using pattern recognition algorithms and artificial intelligence algorithms to determine the task that is being performed.

3. The computer-implemented method of claim 1, wherein determining a task that is being performed comprises accessing pre-saved simulated tasks stored by a manufacturer.

4. The computer-implemented method of claim 1, wherein determining a task that is being performed comprises learning micromovements associated with the task that is being performed by using machine learning algorithms and artificial intelligence algorithms.

5. The computer-implemented method of claim 1, wherein determining a task that is being performed comprises establishing a baseline of micromovements associated with a task based on manual input of a user.

6. The computer-implemented method of claim 1, wherein determining a criticality of the detected anomaly based on a predetermined threshold comprises:
   determining a criticality score of a single tracked micromovement as meeting a predetermined threshold based on a value assigned to the single tracked micromovement; and
   generating a warning that details the single tracked micromovement met the predetermined threshold.

7. The computer-implemented method of claim 1, wherein determining a criticality of the detected anomaly based on a predetermined threshold comprises:
   determining a value for each observed micromovement of a group of observed micromovements based on a matching of an observed movement to a baseline movement, wherein the baseline movement is assigned a corresponding value;

summing determined values for each observed movement;

determining the summed values as the criticality score for the group of observed micromovements; and determining whether the criticality score meets the predetermined threshold.

8. The computer-implemented method of claim 1, further comprising:

in response to determining the criticality score for the detected anomaly meets the predetermined threshold, generating a notification detailing the detected anomaly in the observed.

9. The computer-implemented method of claim 1, further comprising:

in response to determining the criticality score for the detected anomaly meets the predetermined threshold, generating a notification that includes a recommendation of future micromovements to assist with the completion of a task.

10. A computer program product comprising:

one or more computer readable storage media and program instructions stored on the one or more computer readable storage media, the program instructions comprising:

program instructions to determine a task that is being performed based on a set of observed micromovements of an established baseline;

program instructions to analyze the set of observed micromovements being performed by a user;

program instructions to determine the task associated with the analyzed micromovements being performed using a self-adjusting algorithm;

program instructions to predict future micromovements associated with the determined task based on an established baseline set of micromovements associated with the determined task using a pattern recognition algorithm;

in response to determining the task that is being performed, program instructions to detect an anomaly in at least one micromovement in the set of observed micromovements based on a comparison of the at least one micromovement to one or more micromovements associated with an established baseline of micromovements;

program instructions to detect the anomaly in the determined task based on a comparison of the observed micromovements and the predicted future micromovements;

in response to detecting the anomaly in the determined task, program instructions to determine a criticality score for the detected anomaly based on a predetermined threshold; and program instructions to generate a notification on a user interface that details the detected anomaly.

11. The computer program product of claim 10, wherein the program instructions to determine a task that is being performed comprise program instructions to use pattern recognition algorithms and artificial intelligence algorithms to determine the task that is being performed.

12. The computer program product of claim 10, wherein the program instructions to determine a task that is being performed comprise program instructions to access pre-saved simulated tasks stored by a manufacturer.

13. The computer program product of claim 10, wherein the program instructions to determine a task that is being performed comprise program instructions to learn micromovements associated with the task that is being performed by using machine learning algorithms and artificial intelligence algorithms.

14. The computer program product of claim 10, wherein the program instructions to determine a task that is being performed comprise program instructions to establish a baseline of micromovements associated with a task based on manual input of a user.

15. The computer program product of claim 10, wherein the program instructions to determine a criticality score for the detected anomaly based on a predetermined threshold comprise:

program instructions to determine a criticality score of a single tracked micromovement as meeting a predetermined threshold based on a value assigned to the single tracked micromovement; and program instructions to generate a warning that details the single tracked micromovement met the predetermined threshold.

16. The computer program product of claim 10, wherein the program instructions to determine a criticality score for the detected anomaly based on a predetermined threshold comprise:

program instructions to determine a value for each observed micromovement of a group of observed micromovements based on a matching of an observed movement to a baseline movement, wherein the baseline movement is assigned a corresponding value;

program instructions to sum the determined values for each observed movement;

program instructions to determine the summed values as the criticality score for the group of observed micromovements; and program instructions to determine whether the criticality score meets the predetermined threshold.

17. A computer system comprising:

one or more computer processors;

one or more computer readable storage media; and program instructions stored on the one or more computer readable storage media for execution by at least one of the one or more processors, the program instructions comprising:

program instructions to determine a task that is being performed based on a set of observed micromovements of an established baseline;

program instructions to analyze the set of observed micromovements being performed by a user;

program instructions to determine the task associated with the analyzed micromovements being performed using a self-adjusting algorithm;

program instructions to predict future micromovements associated with the determined task based on an established baseline set of micromovements associated with the determined task using a pattern recognition algorithm;

in response to determining the task that is being performed, program instructions to detect an anomaly in at least one micromovement in the set of observed micromovements based on a comparison of the at least one micromovement to one or more micromovements associated with an established baseline of micromovements;

program instructions to detect the anomaly in the determined task based on a comparison of the observed micromovements and the predicted future micromovements;

in response to detecting the anomaly in the determined task, program instructions to determine a criticality score for the detected anomaly based on a predetermined threshold; and program instructions to generate a notification on a user interface that details the detected anomaly.

* * * * *